United States Patent

(12) United States Patent  
Winn

(10) Patent No.: US 9,143,709 B1  
(45) Date of Patent: Sep. 22, 2015

(54) NON-UNIFORMITY CORRECTION (NUC) GAIN DAMPING

(75) Inventor: Stuart Martin Winn, Salem, VA (US)

(73) Assignee: Exelis, Inc., Herndon, VA (US)

( * ) Notice: Subject to any disclaimer, the term of this patent is extended or adjusted under 35 U.S.C. 154(b) by 903 days.

(21) Appl. No.: 13/365,611

(22) Filed: Feb. 3, 2012

Related U.S. Application Data

(60) Provisional application No. 61/483,938, filed on May 9, 2011.

(51) Int. Cl.
G06K 9/00 (2006.01)
H04N 5/365 (2011.01)
H04N 5/367 (2011.01)

(52) U.S. Cl.
CPC .............. *H04N 5/3651* (2013.01); *H04N 5/367* (2013.01)

(58) Field of Classification Search
USPC .................................................. 382/274–275
IPC ...................................................... H04N 5/367
See application file for complete search history.

(56) References Cited

U.S. PATENT DOCUMENTS

| | | | |
|---|---|---|---|
| 3,806,633 | A | 4/1974 | Coleman |
| 5,836,872 | A | 11/1998 | Kenet et al. |
| 6,565,686 | B2 | 5/2003 | Bett et al. |
| 6,850,282 | B1 | 2/2005 | Makino et al. |
| 6,900,729 | B2 | 5/2005 | Paximadis et al. |
| 6,920,236 | B2 | 7/2005 | Prokoski |
| 7,199,366 | B2 | 4/2007 | Hahn et al. |
| 7,218,267 | B1 | 5/2007 | Weil |
| 7,308,314 | B2 | 12/2007 | Havey et al. |
| 7,406,184 | B2 | 7/2008 | Wolff et al. |
| 7,436,568 | B1 | 10/2008 | Kuykendall, Jr. |
| 7,507,965 | B2 | 3/2009 | Lane et al. |
| 7,599,574 | B2 * | 10/2009 | Mori ............................ 382/274 |
| 7,620,265 | B1 | 11/2009 | Wolff et al. |
| 7,634,966 | B2 | 12/2009 | Pouliot et al. |
| 7,734,077 | B2 | 6/2010 | Hirsch et al. |
| 7,773,062 | B2 | 8/2010 | Cok |
| 7,787,663 | B2 | 8/2010 | Hartlove |
| 7,834,905 | B2 | 11/2010 | Hahn et al. |
| 8,320,703 | B2 * | 11/2012 | Mizuno ........................ 382/275 |
| 8,494,227 | B2 | 7/2013 | Prokoski |
| 2005/0157942 | A1 * | 7/2005 | Chen et al. .................... 382/275 |
| 2007/0103742 | A1 * | 5/2007 | Ernandes et al. ............. 358/504 |
| 2010/0158407 | A1 | 6/2010 | Standfield |

(Continued)

OTHER PUBLICATIONS

Zin et al. "Fusion of Infrared and Visible Images for Robust Person Detection", Jan. 2011.

(Continued)

*Primary Examiner* — Wesley Tucker  
(74) *Attorney, Agent, or Firm* — RatnerPrestia

(57) ABSTRACT

A system of non-uniformity correction (NUC) for a pixel in an imaging array includes: a storage module for storing (a) a first gain coefficient for correcting a gain error of the pixel and (b) multiple damping factors, including a first damping factor, for adjusting the first gain coefficient, in response to multiple respective light levels that the pixel senses during operation. Also included is a NUC corrector module for receiving a first intensity value from the pixel in response to a first light level. The NUC corrector module extracts the first gain coefficient and a first damping factor from the storage module, and then corrects the first intensity value of the pixel using the (a) first gain coefficient and (b) first damping factor.

16 Claims, 4 Drawing Sheets

(56) References Cited

U.S. PATENT DOCUMENTS

2010/0290703 A1 11/2010 Sim et al.
2012/0123205 A1 5/2012 Nie et al.

OTHER PUBLICATIONS

Matsui et al. "Image Enhancement of Low-Light Scenes with Near-Infrared Flash Images", 2010, ACCV 2009, Part I.

Toet et al. "Merging thermal and visual images by a contrast pyramid", 1989, Optical Engineering 28(7), 789-792.

Salamati et al. "Combining Visible and Near-Infrared Cues for Image Categorisation", 2011.

Zhuo et al. "Enhancing Low Light Images Using Near Infrared Flash Images", 2010, IEEE 17th International Conference on Image Processing.

Susstrunk et al. "Enhancing the Visible with the Invisible: Exploiting Near-Infrared to Advance Computational Photography and Computer Vision", 2010, SID International Symposium Digest.

Gyaourova et al. "Fusion of Infrared and Visible Images for Face Recognition", 2004, Computer Vision—ECCV 2004.

Office Action for U.S. Appl. No. 13/432,439, Issued Feb. 5, 2014.

Farrell, Joyce E., "A Simulation Tool for Evaluating Digital Camera Image Quality", Image Quality and System Performance, Proc. of SPIE-IS&T Electronic Imaging, SPIE vol. 5294 (2004), 124-131.

Hardie, Russell C., "Scene-Based Nonuniformity Correction with Video Sequences and Registration", Applied Optics, vol. 39, No. 8, (Mar. 10, 2000), 1241-1250.

Harris, John G., "Nonuniformity Correction of Infrared Image Sequences Using the Constant-Statistics Constraint", IEEE Transactions on Image Processing, vol. 8, No. 8 (Aug. 1999), 1148-1151.

Hart, R., "A Study of Non-Uniformity Correction Methods for Staring Array IR Detectors", 1st EMRS DTC Technical Conference, Edinburgh (2004), 5 pgs.

Isoz, Wilhelm, "New Improved Nonuniformity Correction for Infrared Focal Plane Arrays", Proceedings of SPIE, vol. 5783, No. 1-6, Abstract, (2005), 49-53.

Means, Robert W., "Adaptive Infrared Non-Uniformity Correction", (Feb. 1999), 16 pgs.

Narayanan, Balaji, "Scene-Based Nonuniformity Correction Technique for Focal-Plane Arrays Using Readout Architecture", Applied Optics, vol. 44, No. 17, (2005), 3482-3491.

Ratliff, Bradley M., "Algorithm for Radiometrically-Accurate Nonuniformity Correction with Arbitrary Scene Motion", SPIE Proceedings, vol. 5076, (Aug. 22, 2003), 82-91.

Rui, Lai, "Improved Neural Network Based Scene-Adaptive Nonuniformity Correction Method for Infrared Focal Plane Arrays", Applied Optics, vol. 47, No. 24, Abstract (2008), 4331-4335.

Torres, Sergio N., "Scene-Based Nonuniformity Correction for Focal Plane Arrays by the Method of the Inverse Covariance Form", Applied Optics, vol. 42, No. 29, (Oct. 10, 2003), 5872-5881.

Torres, Sergio N., "Kalman Filtering for Adaptive Nonuniformity Correction in Infrared Focal-Plane Arrays", J. Opt. Soc. Am. A., vol. 20, No. 3 (Mar. 2003), 470-480.

Vera, Esteban, "Fast Adaptive Nonuniformity Correction for Infrared Focal-Plane Array Detectors", EURASIP, Journal on Applied Signal Processing, vol. 13 (2005), 1994-2004.

Wang, Bing-Jian, "New Real-Time Image Processing System for IRFPA", Optoelectronics Letters, vol. 2, No. 3, Abstract, 225-228.

Zhao, Wenyi, "Scene-Based Nonuniformity Correction and Enhancement: Pixel Statistics and Subpixel Motion", J. Opt. Soc. Am. A, vol. 25, No. 7, Abstract (2008), 1668-1681.

\* cited by examiner

NON-UNIFORMITY CORRECTION (NUC) GAIN DAMPING

CROSS-REFERENCE TO RELATED APPLICATIONS

This application claims priority to U.S. Provisional Patent Application No. 61/483,938, filed May 9, 2011, the contents of which are incorporated by reference herein in its entirety.

STATEMENT REGARDING FEDERALLY SPONSORED RESEARCH

This invention was made under Dakota Project Contract No. 13635723, 22D and the United States Government may have certain rights in this invention.

FIELD OF THE INVENTION

The present invention relates, in general, to image processing. More specifically, the present invention relates to correcting an image due to non-uniformity of light emitting elements, or pixels of an imaging sensor.

BACKGROUND OF THE INVENTION

Imaging sensors typically include a plurality of light detecting elements, also known as picture elements or pixels. The pixels are usually arranged in an array. When the array is exposed to a subject of interest, each pixel captures a certain amount of light to form an image. Imaging sensors may include non-uniformities that are inherent in the composition of the sensor. For the image to be properly viewed or evaluated, the non-uniformities should be corrected.

Each pixel in the array stores one or more values related to a characteristic of the radiation, such as color, brightness, etc., otherwise known as characteristic data. However, due to manufacturing issues, installation problems, material limitations and defects, a portion of the pixels in the array may not capture and store the characteristic data correctly. Some pixels may be considered good but may still need an adjustment to the data that is stored. Therefore, characteristic data of all the pixels in the array need to be adjusted by one or more correction components.

Generally, the array of pixels is tested and evaluated before field usage or product distribution to determine which of the correction components may need to be applied to the pixels. The correction components include a gain coefficient and an offset coefficient. The gain coefficient is a value that may be multiplied by the characteristic data in order to correct the data. In various embodiments, the gain coefficient may have a range of values from 0 to approximately 2. The offset coefficient is another value that may be added to the characteristic data to provide correction to each pixel. In various embodiments, the offset coefficient may have a range of values from approximately −512 to approximately 511.

Some pixels in the array may need their characteristic data corrected by the gain coefficients, some pixels may need correction by the offset coefficients, some pixels my need both the gain coefficient and offset coefficient corrections. If a pixel is good and needs no correction, as an example, the gain coefficient may have a value of 1 and the offset coefficient may have a value of 0.

In general, an offset coefficient and a gain coefficient are applied to every pixel in the array, so that each pixel will respond to light uniformly. This process is known as non-uniformity correction (NUC) of a pixel. A method used to calculate the NUC offset and gain coefficients involves recording flat field images at various light levels. Normally, two different light levels are selected and a pixel's response to the two different light levels is calculated as a slope and compared to the average slope of the entire sensor.

The method of calculating NUC gain coefficients is linear. Pixels, however, respond non-linearly to different light levels. The inventor discovered that less non-uniformity is observed at light levels near those used to calculate the NUC gain coefficients, but the error/non-uniformity of a non-uniformity corrected pixel may be quite dramatic at extreme ADU levels. The effect of this is that if the average video level of a scene is near the midpoint of the display range, pixels at the upper boundary of the display range may be displayed inaccurately, because the amount of gain applied is inappropriate for this video level.

Accordingly, an improved method is still needed to provide non-uniformity correction of pixels in an imaging array that overcomes the aforementioned problems.

SUMMARY OF THE INVENTION

To meet this and other needs, and in view of its purposes, the present invention provides a system of non-uniformity correction (NUC) for a pixel in an imaging array. The system includes a storage module for storing (a) a first gain coefficient for correcting a gain error of the pixel and (b) multiple damping factors, including a first damping factor, for adjusting the first gain coefficient, in response to multiple respective light levels that the pixel senses during operation. Also included is a NUC corrector module for receiving a first intensity value from the pixel in response to a first light level. The NUC corrector module extracts the first gain coefficient and a first damping factor from the storage module. The NUC corrector module corrects the first intensity value of the pixel using the (a) first gain coefficient and (b) first damping factor.

The system further includes an NUC calibration module for calculating the first gain coefficient and the multiple damping factors, and providing the first gain coefficient and the multiple damping factors to the storage module. The first gain coefficient is determined by capturing a flat field image at a predetermined light level. The multiple damping factors are determined by capturing multiple flat field images at a plurality of further light levels, and calculating a change in gain at each of the plurality of further light levels.

The NUC calibration module is configured for calculation during a calibration mode, and configured for operation during an operating mode. The NUC calibration module is configured to determine a first offset coefficient for adjusting an offset value of the pixel. The storage module is configured to receive and store the first offset coefficient from the NUC calibration module. The storage module includes a look-up table (LUT) of the multiple respective light levels corresponding to the multiple damping factors of the pixel. The storage module stores (a) a second gain coefficient for correcting a gain error of another pixel and (b) multiple damping factors, including a second damping factor, for adjusting the second gain coefficient, in response to multiple respective light levels that the other pixel senses during operation. The NUC corrector module corrects a second intensity value of the other pixel using the (a) second gain coefficient and (b) second damping factor.

The NUC corrector module includes a subtractor, a multiplier and an adder for (a) the subtractor reducing a value of 1 by the first gain coefficient to provide a reduced value, (b) the multiplier multiplying the first damping factor by the reduced value to provide a multiplied value, and (c) the adder adding or subtracting the multiplied value from the value of 1 to provide a corrected gain of the pixel. The NUC corrector module also includes an offset adjustment value which is multiplied by the corrected gain of the pixel to provide a final output data of the pixel.

Another embodiment of the present invention is a method for non-uniformity correction (NUC) of a pixel in an imaging array. The method includes the steps of:

storing a gain coefficient of the pixel;

storing a plurality of damping factors for a corresponding plurality of video levels of the pixel;

determining a video level of the pixel; and correcting the pixel, at the determined video level, by adjusting the gain coefficient of the pixel using a stored damping factor that corresponds to the determined video level of the pixel.

The method also includes the steps of:

storing an offset coefficient for the pixel; and correcting the pixel using the stored offset coefficient for the pixel.

Yet another embodiment of the present invention is a method for non-uniformity correction (NUC) of a pixel in an imaging array. The method includes the steps of:

determining a video level of the pixel;

selecting a predetermined NUC gain for the pixel;

modifying the predetermined NUC gain by a damping factor to provide a damped gain;

correcting the video level of the pixel using the damped gain.

The method further includes the steps of:

storing at least one function that mathematically expresses multiple gain values of the pixel as a function of respective video levels of the pixel;

selecting a gain value from the function based on the video level determined for the pixel;

using the selected gain value to calculate the damped gain;

subtracting the selected gain value from a value of 1 to provide a subtracted value;

multiplying the subtracted value by the damping factor of the pixel to provide a multiplied value;

adding or subtracting the multiplied value from the value of 1 to provide a calculated damped gain;

adding an offset value to the video level of the pixel; and multiplying the offset value with the calculated damped gain to provide the corrected video level of the pixel.

The step of storing includes: storing a plurality of functions that mathematically express multiple gain values of the pixel as a function of the respective video levels of the pixel; and the step of selecting includes: selecting the gain value from the plurality of functions that is adjacent to the predetermined NUC gain for the pixel.

It is understood that the foregoing general description and the following detailed description are exemplary, but are not restrictive, of the invention.

BRIEF DESCRIPTION OF THE DRAWINGS

The invention may be understood from the following detailed description when read in connection with the accompanying figures.

DETAILED DESCRIPTION OF THE INVENTION

As will be explained, the present invention calculates a damping factor, which is applied to each gain coefficient used to correct each respective pixel in an imaging array. The damping factor is applied to each gain coefficient based on the video level stored by the respective pixel in a look up table (LUT). By applying a damping factor to the gain coefficient of each pixel, a much lower level of non-uniformity is achieved.

Figure 1:
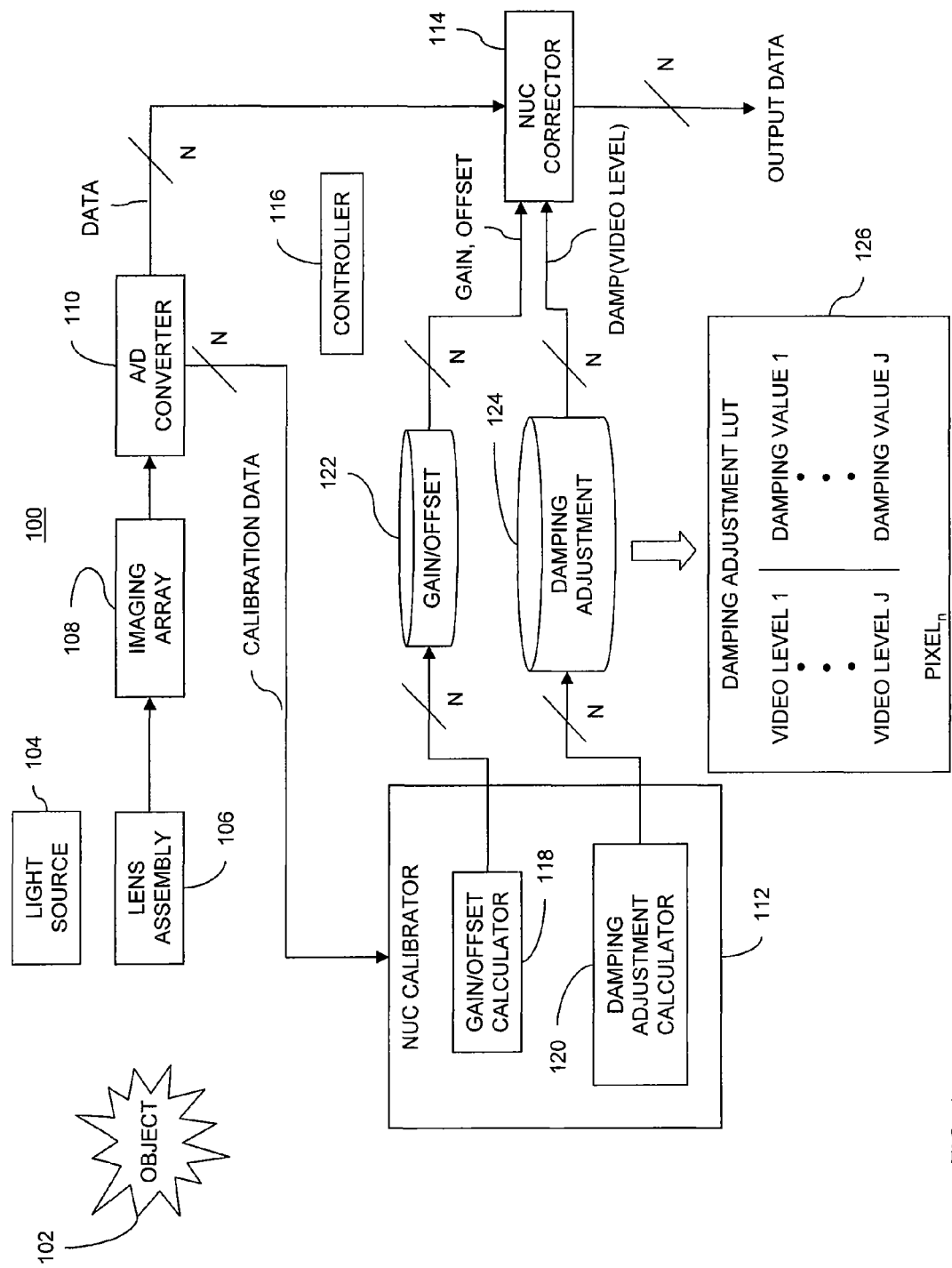
FIG. 1 is a non-uniformity correction (NUC) system, in accordance with an embodiment of the present invention.

Referring to FIG. 1, there is shown a non-uniformity correction (NUC) system, designated as 100, in accordance with an embodiment of the present invention. As shown, system 100 includes NUC calibrator module 112, gain/offset module 122, damping adjustment module 124 and NUC corrector module 114. Also included is lens assembly 106 receiving light reflected from object 102 by using light source 104. The imaging array 108 provides pixel intensities in response to the light received by lens assembly 106. An analog-to-digital converter (ADC) 110 outputs digital data representing the intensities sensed by the pixels in imaging array 108.

As shown, the digital data is sent to NUC corrector module 114 and to NUC calibrator module 112. During normal operation, a frame of data is sent to the NUC corrector module, where pixel data is corrected and then outputted as final image data. During calibration, on the other hand, a frame of data is sent to NUC calibrator module 112 for calibrating the correction coefficients, prior to sending them to NUC corrector module 114.

The NUC calibrator module includes a gain and offset calculator, designated as 118, and a separate damping adjustment calculator, designated as 120. Gain and offset coefficients are calculated for every pixel in imaging array 108 and then stored in gain/offset memory module 122. In addition, a damping factor is calculated for different video levels that are sensed by each pixel of imaging array 108. The damping factors are stored in damping adjustment memory module 124.

The damping adjustment memory module 124 may include a look-up table (LUT) 126. For each pixel (for example, pixel n), there are multiple video levels (for example, video $level_{1, 2, 3, \ldots, j}$) that correspond to multiple damping values (for example, damping $value_{1, 2, 3, \ldots, j}$), respectively. These values are calculated by damping adjustment calculator module 120 by exposing imaging array 108 to different light intensities transmitted from light source 104.

Accordingly, the present invention provides a gain coefficient; an offset coefficient; and damping factors as a function of video input levels for each pixel of imaging array 108. The intensity value sensed by each pixel is, thus, corrected using the two coefficient values and the appropriate damping factor in NUC corrector module 114.

Figure 2:
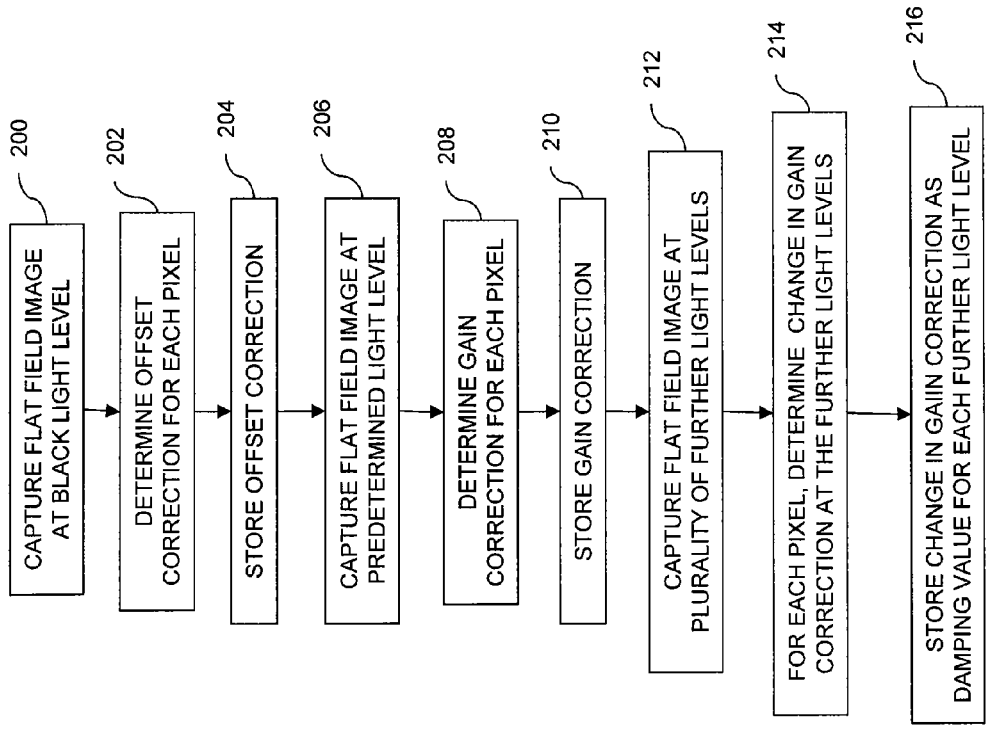
FIG. 2 is a flow diagram used by the non-uniformity correction (NUC) system 100 shown in FIG. 1, in accordance with an embodiment of the present invention.

An example of a method used by the non-uniformity correction (NUC) system 100 is shown in FIG. 2. As shown, a flat field image (for example, a black light level) is captured by step 200. Step 202 calculates the offset correction to be used for each pixel in imaging array 108. The offset correction is stored by step 204 in gain/offset memory module 122. Using another flat field image at a predetermined light level, step 206 captures the intensity of each pixel value in imaging array 108. A gain correction coefficient is calculated for each pixel by step 208 and stored as a gain correction coefficient in gain/offset memory module 122 by step 210.

Using multiple light levels, by way of light source 104, step 212 captures a flat field image for each light level. For each pixel, step 214 determines the change of gain between each light level and a light level producing unity gain for each pixel. The change in gain becomes the damping value for each light level. This value is stored in damping adjustment module 124. Accordingly, a look-up table (LUT) may be formed, for each pixel (for example, pixel n), which includes multiple video levels, namely, video level$_{1, 2, 3, \ldots j}$, that correspond to multiple damping values, namely, damping value$_{1, 2, 3, \ldots j}$.

Figure 3:
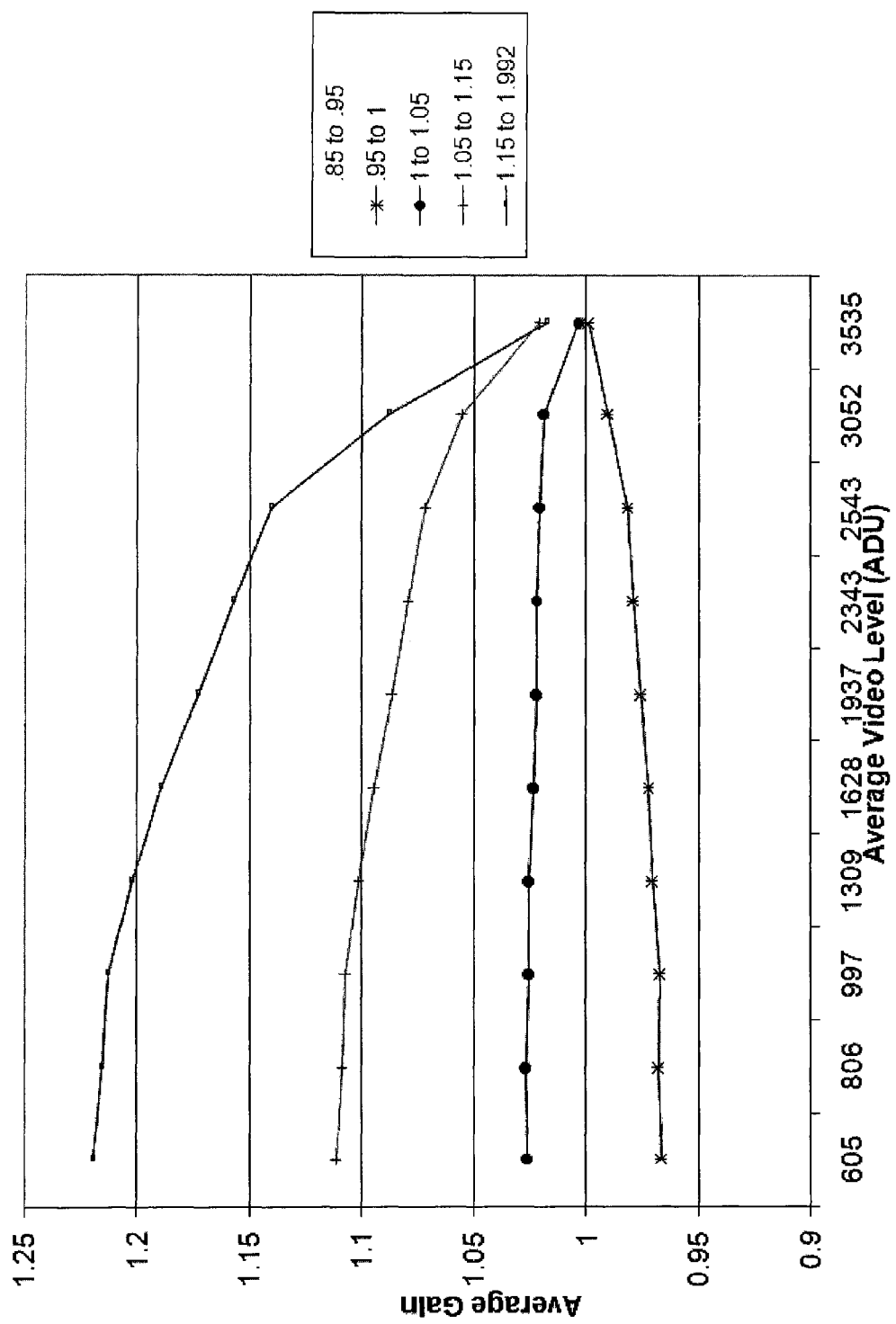
FIG. 3 is a plot of average gain as a function of average video level (in ADU), depicting examples of variations in gain as the pixel video levels are changed.

Referring to FIG. 3, there is shown an example of curves depicting average gain as a function of average video level (in ADU). As shown, groups of pixels are grouped into different regions as a function of NUC gain, in order to correctly adjust the intensity output of a pixel at normal temperature and light level. An average gain for each slope band may be compared to the same group from images taken under different lighting conditions. The slope bands demonstrate that NUC does vary with video levels. For example, at an average video level of 605 ADU, there are four different average gain values for the four groups of pixels, respectively. The average gain at 605 ADU varies from 0.097 up to 1.22. Much of this effect is corrected by the present invention by adjustment based on the ADU value, which is applied as a damping factor to the gain and offset coefficients of each pixel. It will be appreciated that as the average video level is increased all the pixels tend to converge upon an average gain of approximately unity (1).

Figure 4:
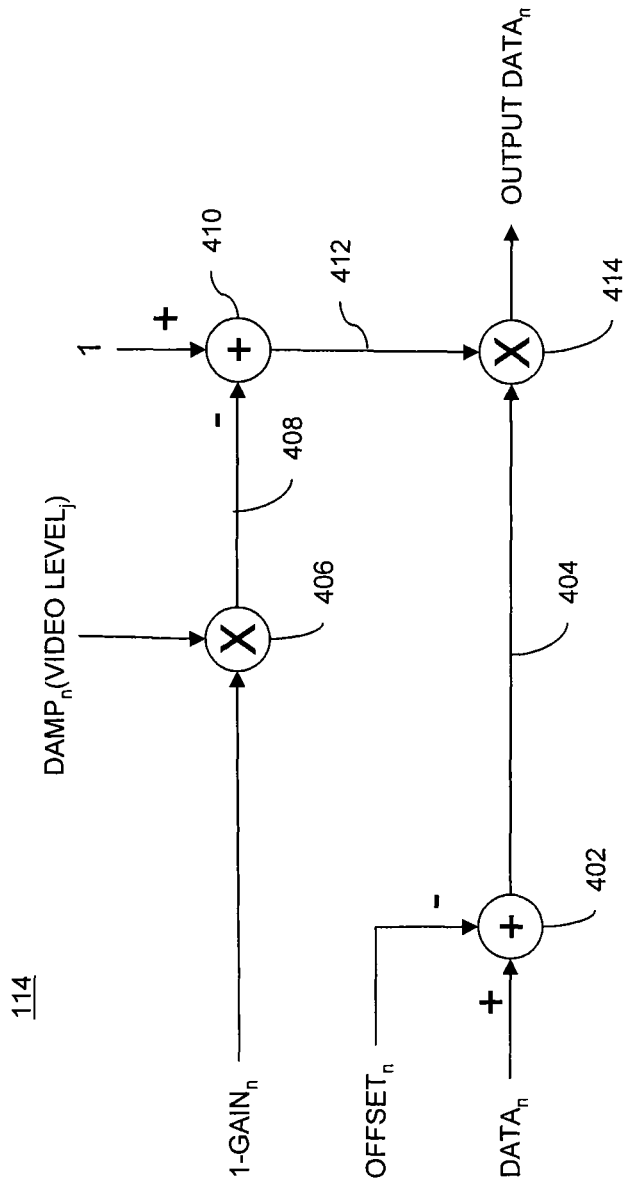
FIG. 4 is a functional diagram showing how correcting the non-uniformity of a pixel is accomplished by the NUC corrector module of the system shown in FIG. 1, in accordance with an embodiment of the present invention.

Referring now to FIG. 4, there is shown a functional diagram, generally designated as 114, for correcting the non-uniformity of a pixel in imaging array 108. It will be appreciated that the elements shown in the functional diagram may be implemented by NUC corrector module 114 of system 100. As shown, for each pixel n, a digital intensity value, represented by DATA$_n$, is inputted to summer 402. Also provided into summer 402 is the stored offset coefficient correction value for pixel n, namely, OFFSET$_n$. The intensity value, DATA$_n$, is added to the offset coefficient value, OFFSET$_n$, and the result is outputted onto line 404.

The stored gain coefficient correction value for pixel n, namely GAIN$_n$, is subtracted from unity (1), and inputted into NUC corrector module 114. Also inputted into the NUC corrector module from LUT 126 is a damping factor, DAMP$_n$, at the actual video level of the pixel, namely, VIDEO LEVEL$_j$. This value, DAMP$_n$(VIDEO LEVEL$_j$), is then multiplied by 1-GAIN$_n$ using multiplier 406. The output data from multiplier 406, by way of line 408, is either subtracted from or added to the value of unity (1) using adder 410. If the output data from multiplier 406 is positive (because GAINn is smaller than one), then the output of adder 410 is less than one, due to the change in sign on line 408. If the output data from multiplier 406 is negative, however, (because GAINn is greater than one), then the output of adder 410 is also greater than one, due to the change in sign on line 408. The output data from adder 410 is provided, by way of line 412, to multiplier 414. Multiplier 414 receives the offset corrected data, by way of line 404, and multiplies this value by the corrected gain placed on line 412. The final data for pixel n is outputted as OUTPUT DATA$_n$. The process shown in FIG. 4 is repeated for every pixel in imaging array 108. It will be appreciated that the correct gain values placed on line 412 are the same gain values stored in module 122 of FIG. 1.

It will be appreciated that if the damping factor is not used by the present invention, then multiplier 414 would simply multiply the corrected gain value arriving on line 412 (using only the gain coefficient) with the offset data arriving on line 404 and thus provide the final output data for pixel n. The present invention however, advantageously provides the ADU value of pixel n, which then triggers a call to LUT 126 for reporting the appropriate damping factor for pixel n. This appropriate damping factor then corrects the gain coefficient of pixel n.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system of non-uniformity correction (NUC) for a pixel in an imaging array comprising:
   a lens assembly;
   an analog to digital converter;
   an imaging array, coupled to the analog to digital converter, for providing digital data pixel intensity values in response to a level of the light being received via the lens assembly;
   a storage module for storing:
   (a) a first gain coefficient for correcting a gain error of the pixel and
   (b) multiple damping factors, including a first damping factor, for adjusting the first gain coefficient, in response to multiple respective light levels that the pixel senses during operation, and
   a NUC corrector module, coupled to the analog to digital converter, said NUC corrector module comprising a subtractor, a first multiplier, a second multiplier and an adder of the NUC corrector module, the NUC corrector module configured to:
   receive a first intensity value as digital data from the analog to digital converter of a pixel in response to a first light level,
   extract the first gain coefficient and a first damping factor from the storage module, and
   correct the first intensity digital data value of the pixel wherein:
   the subtractor reduces a value of 1 by the first gain coefficient to provide a reduced value;
   the first multiplier multiplies the first damping factor by the reduced value to provide a multiplied value;
   the adder either adds or subtracts the multiplied value from the value of 1 to provide a corrected gain of the pixel; and
   a second multiplier multiplying an offset adjustment value by the corrected gain of the pixel to provide a final output data value of the pixel.

2. The system of claim 1 including:
   an NUC calibration module for calculating the first gain coefficient and the multiple damping factors and providing the first gain coefficient and the multiple damping factors to the storage module.

3. The system of claim 2 wherein
   the first gain coefficient is determined by capturing a flat field image at a predetermined light level, and
   the multiple damping factors are determined by capturing multiple flat field images at a plurality of further light levels, and calculating a change in gain at each of the plurality of further light levels.

4. The system of claim 2 wherein
   the NUC calibration module is configured to calculate during a calibration mode, and the NUC corrector module is configured to operate during an operating mode.

5. The system of claim 2 wherein
the NUC calibration module is configured to determine a first offset coefficient for adjusting an offset value of the pixel, and
the storage module is configured to receive and store the first offset coefficient from the NUC calibration module.

6. The system of claim 1 wherein
the storage module includes a look-up table (LUT) of the multiple respective light levels corresponding to the multiple damping factors of the pixel.

7. The system of claim 1 including:
the storage module for storing (a) a second gain coefficient for correcting a gain error of another pixel and (b) multiple damping factors, including a second damping factor, for adjusting the second gain coefficient, in response to multiple respective light levels that the other pixel senses during operation, and
the NUC corrector module correcting a second intensity value of the other pixel using the (a) the second gain coefficient and (b) the second damping factor.

8. A method for non-uniformity correction (NUC) of a pixel in an imaging array, the method comprising the steps of:
capturing a flat field image at a predetermined light level by an imaging array;
based on the predetermined light level of the captured image, determining a gain coefficient of a pixel of the flat field image;
storing, in a storage module, the determined gain coefficient of the pixel;
storing a plurality of damping factors for a corresponding plurality of video levels of the pixel, wherein an individual damping factor of the plurality of damping factors is determined by a ratio between (a) the gain coefficient of a pixel at a predetermined light level and (b) a gain coefficient of the pixel at another light level, the other light level being a determined video level of the pixel;
receiving light via a lens assembly at the imaging array;
generating a pixel intensity value based on the received light;
determining a video level of the generated pixel intensity value; and
correcting the pixel intensity value, at the determined video level, by adjusting the gain coefficient of the pixel intensity value using a stored damping factor that corresponds to the determined video level of the pixel intensity.

9. The method of claim 8 including the steps of:
storing an offset coefficient for the pixel; and
correcting the pixel using the stored offset coefficient for the pixel.

10. The method of claim 8 including the steps of:
storing another plurality of damping factors for a corresponding plurality of video levels of another pixel;
determining another video level of the other pixel; and
correcting the other pixel, at the determined other video level, by adjusting the gain coefficient of the other pixel using a stored damping factor that corresponds to the determined video level of the other pixel.

11. The method of claim 8 wherein
the gain is adjusted by subtraction from a value of 1 to obtain a reduced value, next the reduced value is multiplied by the stored damping factor to provide a multiplied value, and the multiplied value is subtracted from or added to the value of 1 to provide a corrected gain value of the pixel.

12. The method of claim 11 wherein:
the corrected gain value of the pixel is adjusted by an offset coefficient value to obtain a final output data of the pixel.

13. A method for non-uniformity correction (NUC) of a pixel in an imaging array, the method comprising the steps of:
generating, at an imaging array, an intensity value of pixel;
determining a video level of the pixel based on the pixel intensity value;
storing, in a storage module, a damping factor of the pixel based on average video levels of pixel intensity values of the imaging array and at least one function that mathematically expresses multiple gain values of the pixel as a function of respective video levels of the pixel;
selecting a gain value using the at least one function based on the determined pixel video level, wherein the selected gain value is a predetermined NUC gain for the determined pixel video level;
subtracting the selected gain value from a value of 1 to provide a subtracted value;
multiplying the subtracted value by the damping factor of the pixel to provide a multiplied value; and
adding or subtracting the multiplied value from the value of 1 to provide a calculated damped gain;
and
correcting the video level of the pixel using the damped gain.

14. The method of claim 13 including the steps of:
adding an offset value to the video level of the pixel; and
multiplying the offset value with the calculated damped gain to provide the corrected video level of the pixel.

15. The method of claim 13 wherein:
the step of storing includes:
storing a plurality of functions that mathematically express multiple gain values of the pixel as a function of the respective video levels of the pixel; and
the step of selecting includes the step of:
selecting the gain value from the plurality of functions that is adjacent to the predetermined NUC gain for the pixel.

16. The method of claim 15 wherein storing includes:
storing the plurality of functions in a look-up table (LUT) as distinct gain values for corresponding respective video levels of the pixel.

* * * * *